United States Patent
De Gaetano et al.

(10) Patent No.: US 10,620,928 B2
(45) Date of Patent: Apr. 14, 2020

(54) GLOBAL CLOUD APPLICATIONS MANAGEMENT

(71) Applicant: International Business Machines Corporation, Armonk, NY (US)

(72) Inventors: Rossella De Gaetano, Rome (IT); Valentina Martucci, Avellino (IT); Sandro Piccinini, Rome (IT)

(73) Assignee: International Business Machines Corporation, Armonk, NY (US)

( * ) Notice: Subject to any disclaimer, the term of this patent is extended or adjusted under 35 U.S.C. 154(b) by 496 days.

(21) Appl. No.: 15/398,669

(22) Filed: Jan. 4, 2017

(65) Prior Publication Data
US 2018/0191865 A1   Jul. 5, 2018

(51) Int. Cl.
G06F 8/60    (2018.01)
H04L 29/08   (2006.01)
G06F 11/20   (2006.01)
G06F 11/14   (2006.01)
G06F 8/71    (2018.01)

(52) U.S. Cl.
CPC ............ *G06F 8/60* (2013.01); *G06F 11/1484* (2013.01); *G06F 11/2025* (2013.01); *G06F 11/2038* (2013.01); *G06F 11/2048* (2013.01); *H04L 67/10* (2013.01); *G06F 8/71* (2013.01)

(58) Field of Classification Search
None
See application file for complete search history.

(56) References Cited

U.S. PATENT DOCUMENTS

| 8,869,135 B1 * | 10/2014 | Fitzgerald ........... G06F 9/45533 717/168 |
| 9,189,285 B2 | 11/2015 | Ng et al. |
| 9,354,983 B1 | 5/2016 | Yenamandra et al. |
| 9,361,081 B2 | 6/2016 | Li et al. |

(Continued)

FOREIGN PATENT DOCUMENTS

WO    2016053304 A1    4/2016

OTHER PUBLICATIONS

L. Zhang; H. Guo; F. Tao; Y. L. Luo, "Flexible Management of Resource Service Composition in Cloud Manufacturing," Industrial Engineering and Engineering Management (IEEM), 2010 IEEE International Conference on Dec. 7-10, 2010. (Abstract Only).

(Continued)

*Primary Examiner* — Michael A Keller
(74) *Attorney, Agent, or Firm* — Patterson + Sheridan, LLP

(57) ABSTRACT

Systems, methods, and computer program products to perform an operation comprising deploying a first application in a first cloud computing environment of a plurality of cloud computing environments, wherein the first application is composed of a first instance of a first service, determining that the first service has become unavailable in the first cloud computing environment, identifying, by an instance of inventory module executing in the first cloud computing environment, a second instance of the first service in one of the plurality of cloud computing environments, building the first application using the second instance of the first service; and redeploying the first application built using the second instance of the first service in the first cloud computing environment.

17 Claims, 9 Drawing Sheets

(56) References Cited

U.S. PATENT DOCUMENTS

| | | | |
|---|---|---|---|
| 2006/0253848 A1* | 11/2006 | Mathieu | G06F 8/61 |
| | | | 717/168 |
| 2007/0061277 A1* | 3/2007 | Boden | G06F 9/5072 |
| 2011/0265168 A1* | 10/2011 | Lucovsky | H04L 63/0245 |
| | | | 726/7 |
| 2012/0324116 A1 | 12/2012 | Dorai et al. | |
| 2013/0159998 A1* | 6/2013 | Cawlfield | G06F 9/45558 |
| | | | 718/1 |
| 2018/0150356 A1* | 5/2018 | Boshev | G06F 11/203 |

OTHER PUBLICATIONS

Wei-Tek Tsai; Janaka Balasooriya, "Service-Oriented Cloud Computing Architecture," Information Technology: New Generations (ITNG), 2010 Seventh International Conference on Apr. 12-14, 2010. (Abstarct Only).

* cited by examiner

GLOBAL CLOUD APPLICATIONS MANAGEMENT

BACKGROUND

The present invention relates to cloud computing, and more specifically, to global cloud applications management.

Most entities providing software solutions attempt to reduce the business costs associated with information technology (IT) infrastructure while also attempting to convert capital expenditures (CAPEX) into operating expenses (OPEX) that provide more flexibility and control over the software. In one approach, entities provide service solutions where the core of the software solution is hosted on a centralized cloud computing environment, obviating the need for the entities to invest in hardware platforms. In such an approach, the software solutions leverage common services hosted in the cloud computing environment, where the entities pay for the use of these common services. However, multiple services can serve a single application in such an environment. Furthermore, multiple applications can require a single service. situations often result in application deployments that are underutilized, over-constrained, and/or too expensive in light of other lower-cost deployments. As such, a one-size-fits-all approach to management of cloud services and applications often inadequate.

SUMMARY

In one embodiment, a method comprises deploying a first application in a first cloud computing environment of a plurality of cloud computing environments, wherein the first application is composed of a first instance of a first service, determining that the first service has become unavailable in the first cloud computing environment, identifying, by an instance of inventory module executing in the first cloud computing environment, a second instance of the first service in one of the plurality of cloud computing environments, building the first application using the second instance of the first service; and redeploying the first application built using the second instance of the first service in the first cloud computing environment.

In another embodiment, a system comprises a processor and a memory storing instructions, which when executed by the processor, performs an operation comprising deploying a first application in a first cloud computing environment of a plurality of cloud computing environments, wherein the first application is composed of a first instance of a first service, determining that the first service has become unavailable in the first cloud computing environment, identifying, by an instance of inventory module executing in the first cloud computing environment, a second instance of the first service in one of the plurality of cloud computing environments, building the first application using the second instance of the first service; and redeploying the first application built using the second instance of the first service in the first cloud computing environment.

In another embodiment, a computer-readable storage medium has computer-readable program code embodied therewith, the computer-readable program code executable by a processor to perform an operation comprising deploying a first application in a first cloud computing environment of a plurality of cloud computing environments, wherein the first application is composed of a first instance of a first service, determining that the first service has become unavailable in the first cloud computing environment, identifying, by an instance of inventory module executing in the first cloud computing environment, a second instance of the first service in one of the plurality of cloud computing environments, building the first application using the second instance of the first service; and redeploying the first application built using the second instance of the first service in the first cloud computing environment.

DETAILED DESCRIPTION

Embodiments disclosed herein provide flexible management of cloud applications and/or services. More specifically, embodiments disclosed herein optimize utilization of cloud services and maintain an effective distribution of applications and/or services across multiple hosting platforms (e.g., cloud computing environments, data centers, computing clusters, etc.). For example, upon determining that a service is underutilized in a first cloud, embodiments disclosed herein may move the service to a second cloud. Doing so allows applications in the second cloud to use the service, such that the service is not underutilized. Additionally and/or alternatively, embodiments disclosed herein may configure additional applications in the first cloud to use the underutilized service in the first cloud, thereby raising the overall utilization of the service in the first cloud.

Figure 1A:
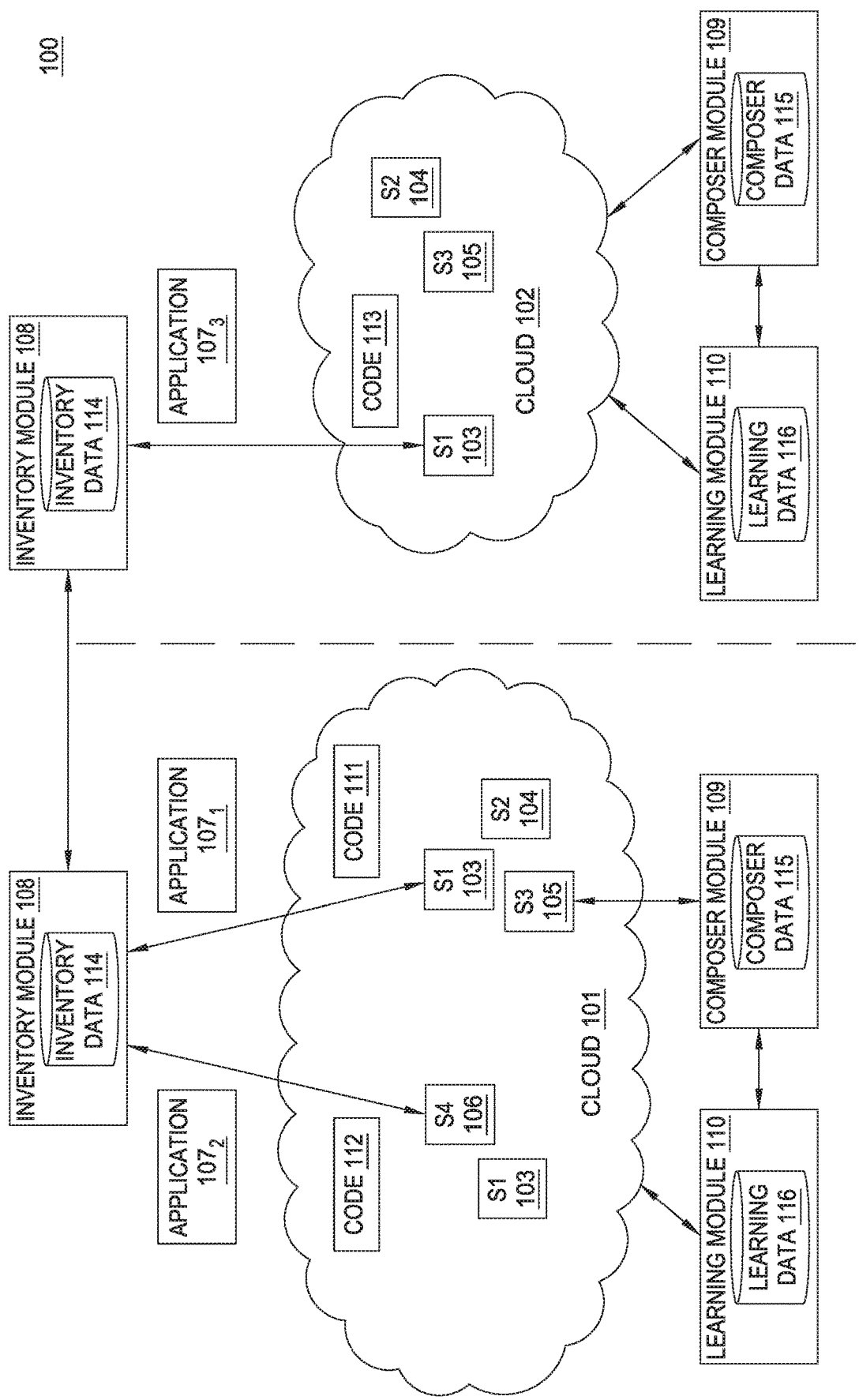
FIGS. 1A-1B illustrate an example system architecture which provides global cloud applications management, according to various embodiments.

FIG. 1A illustrates an example system architecture 100 which provides global cloud applications management, according to one embodiment. As shown, the system 100 includes two example cloud computing environments 101-102 (also referred to as computing clusters, cloud platforms, data centers, and the like). Although two cloud computing environments are depicted, the disclosure is equally applicable to any number of cloud computing environments. Generally, each of the cloud computing environments 101, 102 provides a shared pool of configurable hardware and software computing resources. Examples of shared hardware resources include processors, memory, storage, and network (each not pictured). Examples of shared software resources include operating systems, services, and applications. As shown, cloud 101 includes four example services, namely the services 103-106, while cloud 102 includes the example services 103-105. Generally, a service is a discrete unit of computing functionality that can be accessed remotely and acted upon and updated independently.

Users of the clouds 101, 102 can create applications which use the services 103-106 and 103-105. For example, as shown, an application $107_1$ in cloud 101 is composed of services 103-105 and application code 111, while application $107_2$ in cloud 101 is composed of services 103, 106, and application code 112. Similarly, in cloud 102, application $107_3$ is composed of service 103 and application code 113. The application codes 111-113 are representative of any application code, such as code which links two or more of the services 103-106, and/or code that provides some functionality (e.g., transaction searches, customized reports, etc.).

As shown, the clouds 101, 102 each include an instance of an inventory module 108, a composer module 109, and a learning module 110. The inventory module 108 periodically discovers information about services 103-106, 103-105 executing in the clouds 101, 102 and the user who instantiated the respective services. The inventory module 108 stores the information in the inventory data 114, which is generally configured to store data describing all services and applications in the clouds 101, 102. The inventory module 108 interfaces with the learning module 110 to understand relationships between applications, services, and users, as well as various constraints (e.g., data restriction policies). Generally, the instances of the inventory module 108 monitor their respective clouds 101, 102 for resource use and changes to services and/or applications. Doing so allows the inventory modules 108 to determine when new services and/or applications are deployed and/or removed from the clouds 101, 102, and take actions accordingly. Furthermore, instances of the inventory module 108 in the clouds 101, 102 may communicate to facilitate cross-platform service and/or application management across the clouds 101, 102. Therefore, if a service fails in cloud 101, the instances of the inventory module 108 may find a replacement of the service in cloud 102 that can be used to rebuild an application in cloud 101 using the service in cloud 102. Furthermore, if a new service is deployed in a cloud, the inventory module 108 may determine that a new application can be built using the new service, and recommend to a user to build and deploy the application using the new service. More generally, by maintaining pricing information for using services and/or applications in the inventory data 114, the inventory module 108 can identify opportunities for cost savings and reconfigure the applications and/or services to capture the cost savings (e.g., replace an instance of a first service with a free version of a second service that provides the same functionality as the first service).

The composer module 109 contains the logic to bind services (e.g., the services 103-106 in cloud 101 and services 103-105 in cloud 102) and application code (e.g. the application code 111-113) and create instances of applications using instructions received from the learning module 110. The composer module 109 is further configured to interface with a user regarding new application deployments, cost savings, and the like. As shown, the composer module 109 stores the composer data 115, which stores information related on how to bind services, how to add the application code to the services, where the application code is located, and rule data for the services, applications, and users (e.g., user X can only deploy service Y in cloud 102, while user Z can deploy service Y in any cloud). The learning module 110 includes the learning data 116, which stores information related to service and application deployments, such as costs and constraints. The learning data 116 may also reflect priority class tags for applications and/or services, such as high priority, low priority, and medium priority tags.

When a user generates an application, the inventory data 114 of the inventory module 108 is enriched with metadata describing the application, such as the services that are used to create the application, environment variables associated with the application, and how much executing the application costs (e.g., license use for each service, the cost of hosting the application in the clouds 101, 102, and the like). For example, as shown, services 103-105 and application code 111 are used to generate application $107_1$ in cloud 101. Once the application $107_1$ is generated, the inventory module 108 in cloud 101 discovers information (and/or receives the information) about the application $107_1$. Specifically, the inventory module 108 determines that services 103-105 and application code 111 are used to generate an instance of the application $107_1$, as well as environment variables associated with the services 103-105 and the application $107_1$, and stores the data in the inventory data 114. Example environment variables include service environment variables used to interact with a service instance, such as a uniform resource locator (URL) of the services 103-105 and authentication credentials required to access the services 103-105. Example application environment variables include a version, state, and status of the application, as well as information about the execution environment of the application, such as maximum available memory, virtual disk space, and available file descriptors. In at least one embodiment, the inventory module 108 receives the environment variables from a management component (not pictured) of the clouds 101, 102, such as a hypervisor and/or hardware management console.

Similarly, after an application is generated, the composer data 115 of the composer module 109 is enriched with metadata describing the application. Specifically, the composer data 115 is populated with metadata describing how to bind the services that are used by an application, how to add the application code, where the application code is located, constraints for the services and/or application code of the application, and constraints for deploying the application. For example, when the application $107_1$ is generated, the composer module 109 of cloud 101 retrieves and/or receives information specifying how to bind services 103-105, where application code 111 is located, how to add the application code 111 to the services 103-105, that application code 111 is private (e.g., accessible only by a set of users), service 103 is private, and services 104-105 are public (e.g., accessible by all users). Furthermore, for example, the composer data 115 may be enriched with metadata specifying that instances of application $107_1$ may only be deployed in the same platform (e.g., the cloud 101, rather than both cloud 101 and cloud 102). Therefore, the composer module 109 is configured to learn how to redistribute and/or rearrange services based on a set of policies (e.g., lowest cost policy, high performance policy, energy savings policy, etc.).

The composer module 109 then notifies the learning module 110 of the existence of generated applications and associated metadata. Specifically, the composer module 109 provides composer data 115 to the learning module 110, which includes an indication of what services are used by an application, which application code is used to generate the application, costs associated with the application, and any associated constraints with the application, its services, and/or application code. For example, the composer module 109 in cloud 101 may specify, to the learning module 110 in cloud 101, that application $107_2$ is composed of services 103, 106, and application code 112, based on data stored in the composer data 115. The composer module 109 may further specify a cost associated with using services 103, 106, and/or application code 112. As previously indicated, at least one embodiment, the composer module 109 and/or a user may provide an indication to the learning module 110 that one of the services is a "high priority" or otherwise important service for the application $107_2$.

Figure 1B:
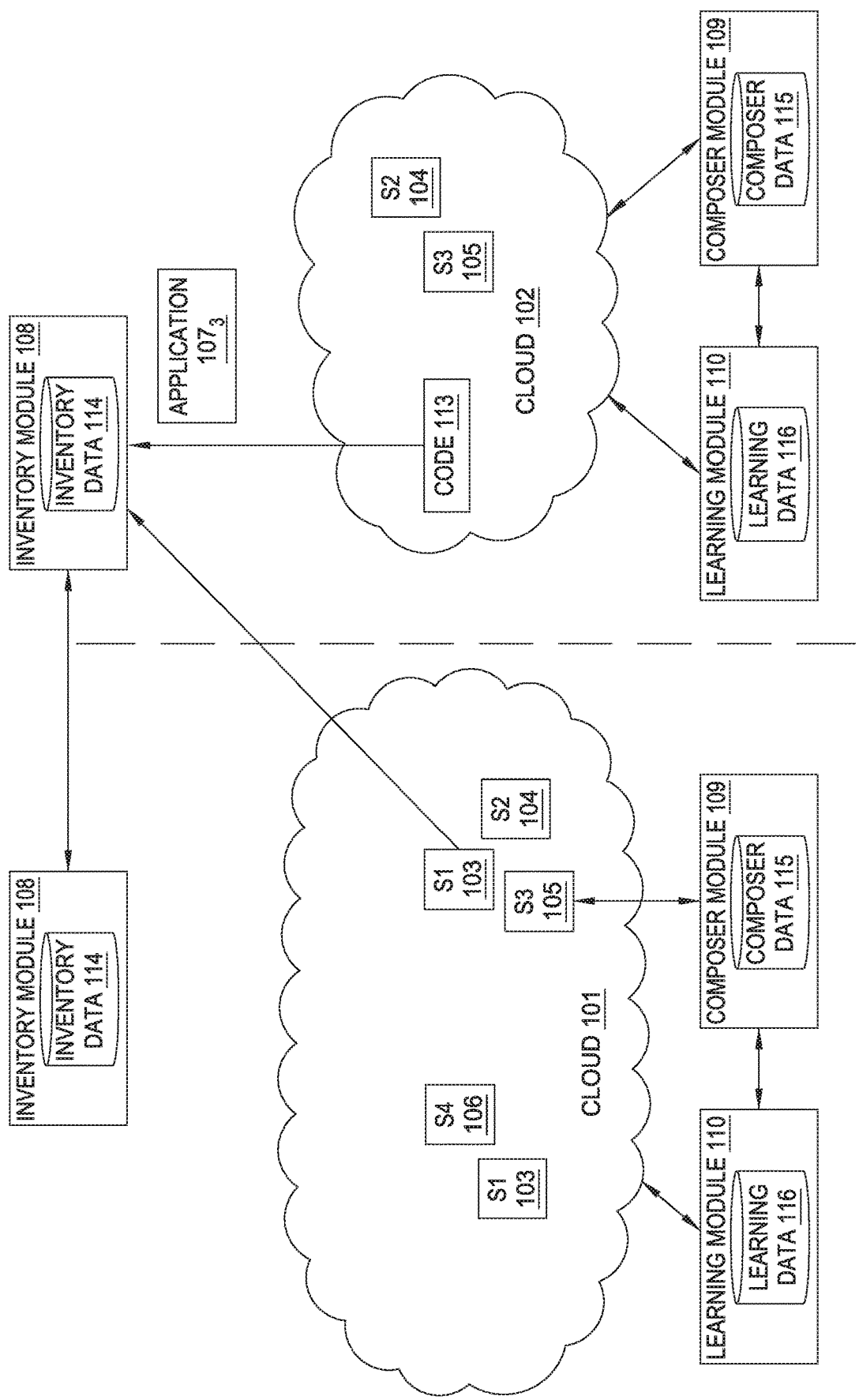

Generally, the inventory module 108, the composer module 109, and learning module 110 are configured to orchestrate management of applications and/or services in the clouds 101, 102. For example, the inventory module 108 in cloud 102 may determine that service 103 has failed or is otherwise inaccessible (and as such, application $107_3$ is not functioning properly). As such, the inventory module 108 may attempt to find another instance of service 103 in cloud 102. However, upon determining that an additional instance of service 103 does not exist in cloud 102, the instance of the inventory module 108 in cloud 102 may communicate with the instance of the inventory module in cloud 101, which indicates that cloud 101 has at least one available instance of service 103. As such, as depicted in FIG. 1B, the inventory module 108 in cloud 102 may notify the composer module 109 in cloud 102 to bind the instance of service 103 to application code 113, thereby creating a working instance of application $107_3$ in cloud 102.

Furthermore, the inventory module 108, the composer module 109, and learning module 110 are configured to manage application and service deployments in the clouds 101, 102. For example, if a user instantiates service 106 in cloud 102, the inventory module 108 of cloud 102 stores an indication of the instantiation of service 106 in cloud 102. The inventory module 108 may then receive an indication from the learning module that service 106, service 105, and application code 112 can be used to create a new application. The inventory module 108 may then inform the composer module 109, which knows where to find the application code 112 and that the application code 112 is accessible to the user (based on access permission metadata for the application code 112 maintained by the composer module 109). The composer module 109 may then output an indication to the user that, if desired, the composer module 109 can create the new application for the user. The indication may specify a cost associated with generating the new application. Responsive to receiving permission from the user, the composer module 109 may generate and deploy the new application in the cloud 102 for the user.

As another example, the composer module 109 may determine that a user X is executing the application $107_1$ in cloud 101. The composer module 109 may further determine, based on the composer data 115, that if user X reduces the instances of service 103, user X could fall under the threshold for free use of service 103. The composer module 109 may then propose to the user to start a new instance of service 103 to build application $107_1$ using the application code 111, the new instance of service 103, and the existing instances of services 104-105, which results in a price reduction for executing application $107_1$. Therefore, the composer module 109 may leverage rules, policies, and other data in the composer data 115 to redistribute and rearrange services across multiple cloud platforms, providing flexibility to react to different user needs and cloud constraints.

Figure 2:
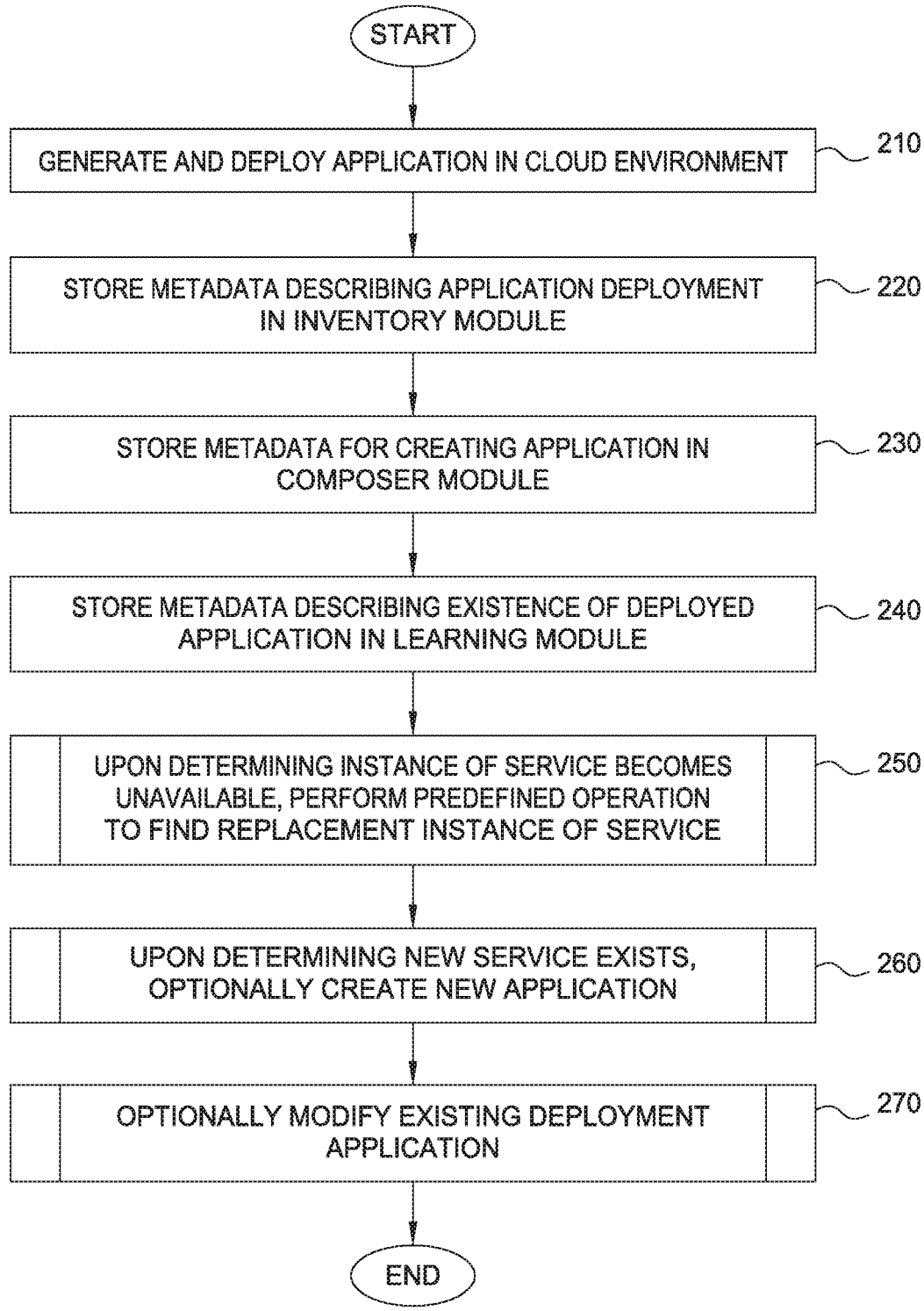
FIG. 2 is a flow chart illustrating a method for global cloud applications management, according to one embodiment.

FIG. 2 is a flow chart illustrating a method 200 for global cloud applications management, according to one embodiment. As shown, the method 200 begins at block 210, where a user generates and deploys an application in a first cloud computing environment. As previously indicated, the application may be composed of various services and application codes. At block 220, metadata describing the deployment of the application is stored in the inventory data 114 of the instance of the inventory module 108 executing in the first cloud computing environment. For example, the metadata stored in the inventory data 114 may include an indication of each service and/or application code used to create the application, a cost associated with using the services and/or application code, and metadata describing the user (and/or associated entity) that deployed the application. At block 230, metadata describing deployment of the application is stored in the composer data 115 of the composer module 109. Example metadata attributes stored in the composer data 115 of the composer module 109 include, without limitation, how to bind the services, where the application code and/or services are located, permissions and/or restrictions for accessing the services and/or application code, how to add the application code to the services, and constraints and/or rules for deploying the application.

At block 240, metadata describing the existence of the deployed application is stored in the learning data 116 of the instance of the learning module 110 deployed in the first cloud computing environment. Example metadata attributes stored in the learning data 116 of the learning module 110 include, without limitation, an indication of which services and/or application code are associated with the application, a respective cost of using the services and/or the application code, and an indication of priorities for any of the services. At block 250, described in greater detail with reference to FIG. 3, a predefined operation is performed to find a replacement instance of a service upon determining an instance of the service has become unavailable in the first cloud computing environment. Generally, at block 250, the instances of the inventory module 108 determine that the service has failed, and attempt to find a replacement instance of the unavailable service in one or more cloud computing environments. If an instance of the service is found on the same (or a different) cloud, the composer module 109 binds the discovered instance of the service to the application(s) affected by the initial unavailability of the service, thereby making the affected application(s) operational again with minimal service disruption.

Figure 3:
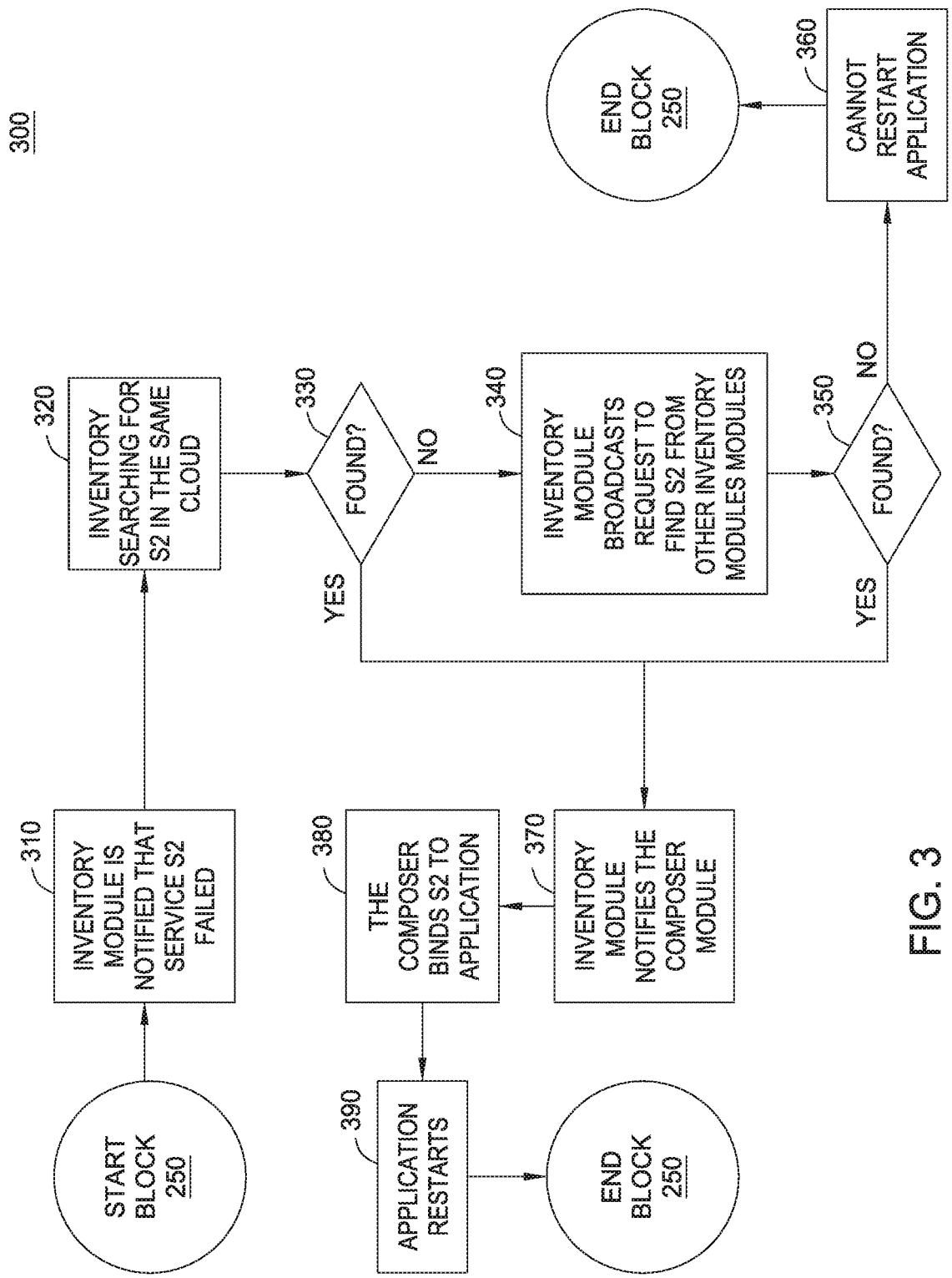
FIG. 3 is a flow chart illustrating an example method to perform a predefined operation to find a replacement instance of a cloud service, according to one embodiment.

At block 260, described in greater detail below with reference to FIG. 4, a new application is deployed upon determining a service exists in the first cloud computing environment. For example, the inventory module 108 and/or the composer module 109 may determine that a new service has been deployed in the first cloud computing environment, and that the new service is a component of a second application that is not currently deployed in the first cloud computing environment. If a user approves deployment of the second application, the inventory module 108 and/or the composer module 109 may create and deploy the second application in the first cloud computing environment. At block 270, described in greater detail with reference to FIG. 5, FIG. 3 is a flow chart illustrating an example method 300 corresponding to block 250 to perform a predefined operation to find a replacement instance of a cloud service, according to one embodiment. As shown, the method 300 begins at block 310, where the inventory module 108 receives a notification that an example service S2 has failed or is otherwise unavailable in the first cloud computing environment. In at least one embodiment, the example service S2 is a component of the application deployed at block 210. At block 320, the inventory module 108 searches for an instance of the service S2 in the first cloud computing environment. In at least one embodiment, the inventory module 108 searches for the instance of the service S2 based on the inventory data 114 describing each service deployed in the first cloud computing environment.

At block 330, the inventory module 108 determines whether an instance of service S2 was found in the first cloud computing environment. If an instance of service S2 is found in the first cloud computing environment, the method 300 proceeds to block 370, otherwise, the method proceeds to block 340. At block 340, the instance of the inventory module 108 in the first cloud computing environment broadcasts a request for service S2 to each of a plurality of other instances of the inventory module 108, where the other instances of the inventory module 108 are in different cloud computing environments. These instances of the inventory module 108 may then determine whether an instance of service S2 exists in their respective cloud computing environments based on the respective inventory data 114. If these instances of the inventory module 108 identify an instance of service S2 in their respective environments, these instances of the inventory module 108 may transmit a corresponding indication to the requesting instance of the inventory module 108 (e.g., the instance of the inventory module 108 in the first cloud computing environment).

At block 350, the instance of the inventory module 108 in the first cloud computing environment determines whether one of the other instances of the inventory module 108 in the other cloud computing environments identified an instance of service S2 in their respective clouds. If an instance was not found, the method proceeds to block 360, where the inventory module 108 of the first cloud computing environment determines that the application affected by the unavailability of service S2 cannot be restarted. However, if an instance of service S2 was found, the method proceeds to block 370. At block 370, the inventory module 108 notifies the composer module 109 of the identified instance of service S2 (including which cloud computing environment the instance of the service S2 is located in, and any associated metadata). At block 380, the composer module 109 binds the identified instance of service S2 to the affected application (e.g., the application deployed at block 210) based on the composer data 115 specifying how to bind the services and add the application code to the services. At block 390, the application is restarted in the first cloud computing environment.

Figure 4:
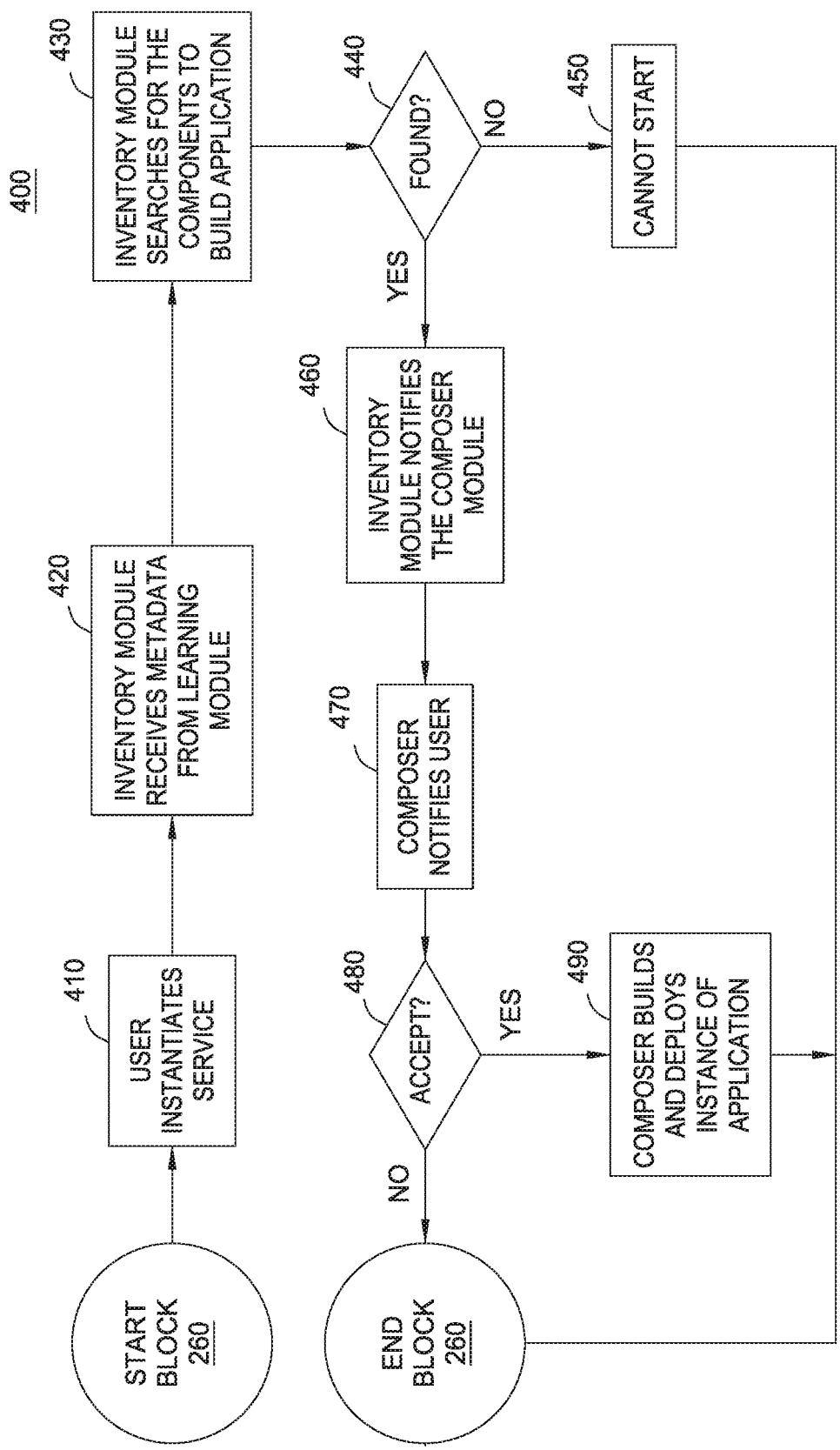
FIG. 4 is a flow chart illustrating an example method to create a new application upon determining a service exists in a cloud platform, according to one embodiment.
Figure 5:
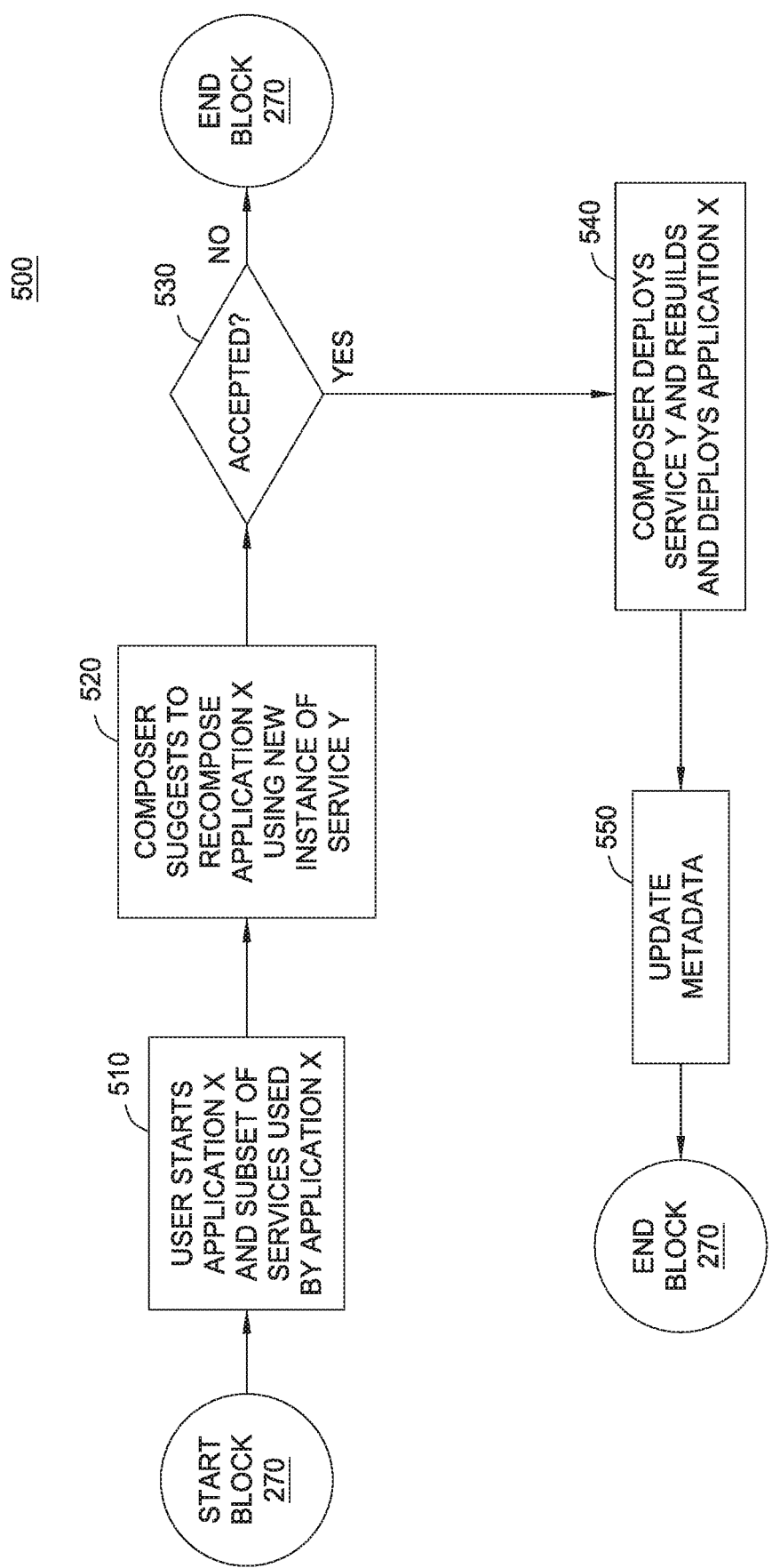
FIG. 5 is a flow chart illustrating an example method to optionally modify an existing deployment of a cloud application, according to one embodiment.

FIG. 4 is a flow chart illustrating an example method 400 to create a new application upon determining a service exists in a cloud platform, according to one embodiment. As shown, the method 400 begins at block 410, where a user instantiates a service (e.g., service S1) in a cloud computing environment. The service may be a new service in that it is the only instance of the service in the cloud computing environment, and/or an additional instance of the service in the cloud computing environment. At block 420, the inventory module 108 receives metadata describing the service S1 from the learning data 116 of the learning module 110. The metadata from the learning data 116 may include the components needed to build the new application, a cost of using the service, a cost of deploying a new application using the service, and any constraints and/or rules related to using the service and/or application. For example, the metadata may specify a cost per hour of using the service and the new application, as well as rules related to deploying the service and/or application, such as a rule specifying that the service and application must be deployed in the same cloud.

At block 430, the inventory module 108 searches for the components required to build the new application using the new service (and/or other services). Generally, the inventory module 108 searches the inventory data 114 to identify the components required to build the new application. In at least one embodiment, the inventory modules 108 from multiple clouds are leveraged to determine whether components to build the new application exist (and comply with any rules and/or policies, such as whether the components are publicly accessible, or accessible to the subject user). At block 440, the inventory module 108 determines whether each of the components of the new application was found at block 430. If the components were not found, the method proceeds to block 450, where the inventory module 108 determines that the new application cannot be started. However, if the components were found, the method proceeds to block 460, where the inventory module 108 notifies the composer module 109 of the existence of the components and the location of each component. At block 470, the composer module 109 notifies the user of the opportunity to build and deploy the new application. For example, the composer module 109 may generate a graphical prompt requiring user feedback to proceed with the new application, a number of suggested instances of the new application, as well as any costs associated with building and deploying each instance of the new application.

At block 480, the composer module 109 determines whether the user accepted the suggestion to build and deploy the new application. If the user does not accept, the method 400 ends. If the user does accept, the method proceeds to block 490, where the composer module builds and deploys one or more instances of the new application, and informs the inventory module 108 of the deployment (which then updates the inventory data 114 accordingly). If the user specifies to build and deploy multiple instances of the new application, the composer module 109 may implement a scoring mechanism to give priority to instantiation of each instance of the application. The scoring mechanism used by the composer module 109 may score each requested instance of the application based on the composer data 115, such as cloud provider policies that are related to financial and performance considerations. For example, the composer module 109 may compute a higher score for a first instance of the new application relative to a second instance of the new application upon determining that deploying the first instance in a first cloud would provide faster performance for lower costs than deploying the second instance in a second cloud, which would provide slower performance for higher costs.

FIG. 5 is a flow chart illustrating an example method 500 corresponding to block 470 to optionally modify an existing deployment of a cloud application, according to one embodiment. Generally, the inventory module 108, composer module 109, and learning module 110 implement the method 500 to redistribute and reallocate services across one or more cloud computing environments based on cost and/or performance policies. For example, if moving a service from a first to a second cloud computing environment would result in better overall performance for an application that uses the service in the first cloud, the composer module 109 may rebuild the application using the service in the second cloud computing environment.

As shown, the method 500 begins at block 510, where a user starts an application X. Additionally, the user starts (or previously started) a subset of the services used by application X. For example, application X may be composed of services A, B, Y, and Z, while the subset of services started by the user include services A, B, and Z, but not service Y. At block 520, the composer module 109 suggests to the user to recompose the application X using a new instance of service Y, where service Y is a new instance of the service started for the user. Generally, the composer module 109 may reference the composer data 115 to determine that the cost of starting a new instance of service Y would result cost the user less money relative to using an instance of service Y provided by the vendor of application X. For example, the user may be associated with a plurality of instances of service A via deployments of application X (and/or other applications). However, the composer module 109 may identify a rule in the composer data 115 that specifies that the user would fall under a free use threshold of service Y (based on the number instances of service Y) if the user were to deploy their own instance of service Y, rather than use the instance of service Y provided with application X. As such, the composer module 109 would output an indication of the savings to the user for approval.

At block 530, the composer module 109 determines whether the user accepted the suggestion to deploy an instance of service Y and recompose application X using the new instance of service Y. If the user does not accept, the method 500 ends. If the user does accept, the composer module 109 deploys a new instance of service Y for the user, and rebuilds and deploys the application X using the new instance of service Y. At block 550, metadata describing the deployment of service Y and application X is stored in the inventory data 114, composer data 115, and learning data 116. The metadata includes an indication of the cost to the user associated with deploying service Y and application X, the license use of service Y and/or application X, and the like.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
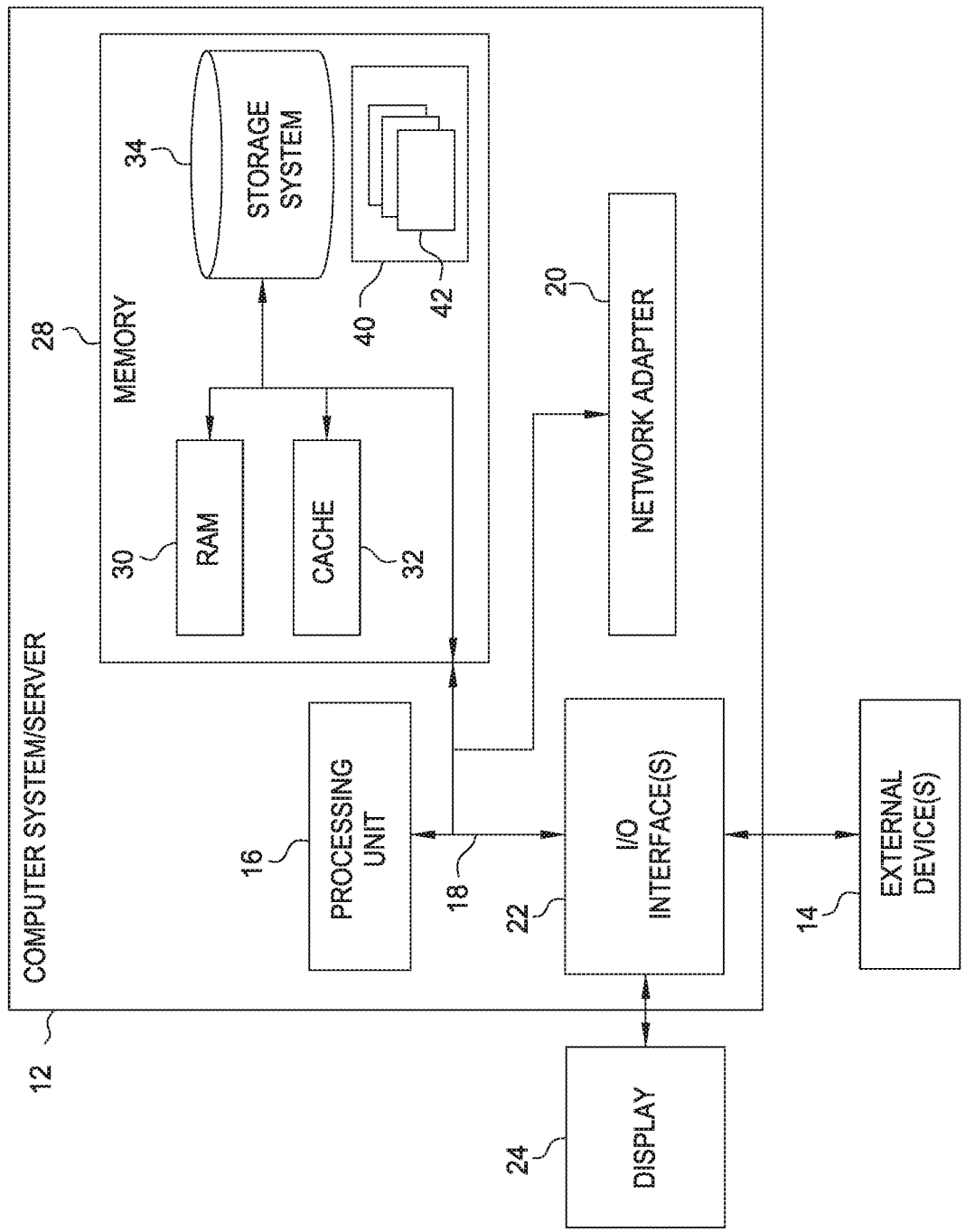
FIG. 6 depicts a cloud computing node, according to one embodiment.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). The storage 34 includes the inventory data 114, composer data 115, and learning data 116. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. The program modules 42 include the inventory module 108, composer module 109, and learning module 110.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
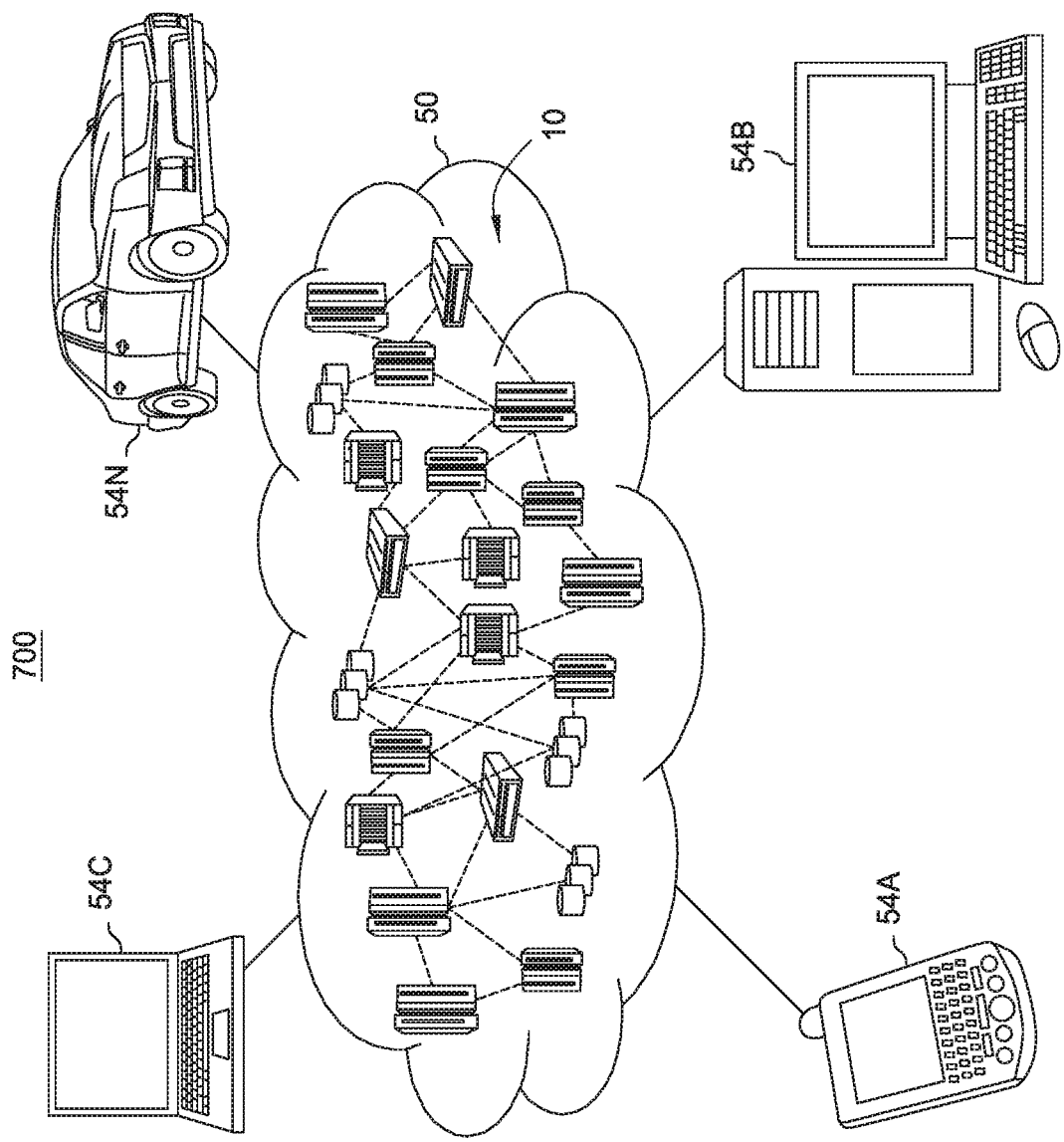
FIG. 7 depicts a cloud computing environment, according to one embodiment.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
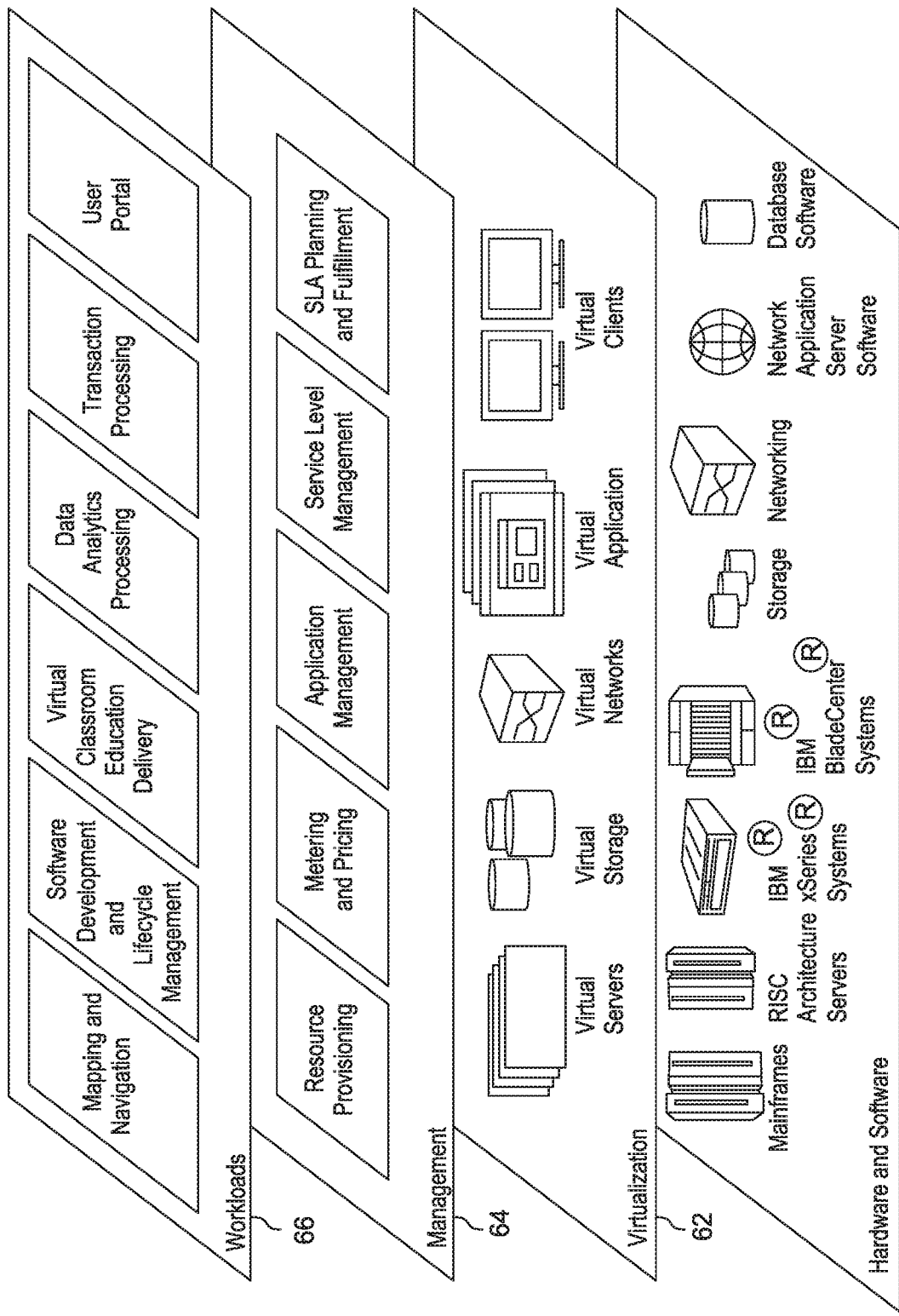
FIG. 8 depicts abstraction model layers, according to one embodiment.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Application management includes global application and/or service management implemented by the inventory module 108, composer module 109, and learning module 110, described in greater detail above. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and user portal.

Advantageously, embodiments disclosed herein provide techniques to dynamically manage services and/or applications across multiple heterogeneous cloud computing environments based on one or more policies related to cost, performance, and constraints. Doing so improves cloud computing by providing scalable, flexible service and application management to a variety of users.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
    deploying a first application in a first cloud computing environment of a plurality of cloud computing environments, wherein the first application is composed of a first instance of a first service;
    storing, in an inventory data store, data describing: (i) each of the components of the first application, wherein the components comprise a plurality of services including the first instance of the first service and a first application code, and (ii) a cost of deploying the first application;
    storing, in a composer data store, data describing: (i) how to bind the plurality of services, (ii) how to add the application code to the plurality of services, (iii) where the services and the application code are located, (iv) a set of entities able to access each of the plurality of services and the first application code, and (v) a set of constraints for deploying instances of the first service and the first application; and
    storing, in a learning data store, data describing: (i) the existence of the first application in the first cloud computing environment, and (ii) a respective priority for the first application and the first instance of the first service;
    determining that the first service has become unavailable in the first cloud computing environment;
    identifying, by an instance of an inventory module executing in the first cloud computing environment, a second instance of the first service in one of the plurality of cloud computing environments, wherein the second instance of the first service is identified in a second cloud computing environment, of the plurality of cloud computing environments;
    building the first application using the second instance of the first service; and
    redeploying, in the first cloud computing environment, the first application built using the second instance of the first service.

2. The method of claim 1, further comprising subsequent to redeploying the first application in the first cloud computing environment:
- storing, in the inventory data store, data describing: (i) each of the components of the first application, wherein the components comprise a plurality of services including the second instance of the first service in the second cloud computing environment and the first application code, and (ii) a cost of deploying the first application using the second instance of the service;
- storing, in the composer data store, data describing: (i) how to bind the plurality of services including the second instance of the first service in the second cloud computing environment, (ii) how to add the application code to the plurality of services, (iii) where the services and the application code are located, (iv) a set of entities able to access each of the plurality of services and the first application code, and (v) a set of constraints for deploying instances of the first service and the first application; and
- storing, in the learning data store, data describing: (i) the existence of the first application in the first cloud computing environment, and (ii) a respective priority for the first application and the second instance of the first service.

3. The method of claim 1, further comprising:
- determining that an instance of a second service has been deployed in the first cloud computing environment;
- determining that a second application uses the second service and can be deployed based on the deployment of the second service;
- building the second application using the instance of the second service; and
- deploying the second application built using the instance of second service in the first cloud computing environment.

4. The method of claim 1, further comprising:
- determining that a count of instances of the first service deployed in the first cloud computing environment and allocated to a first user exceed a threshold;
- determining that deploying a third instance of the first service and allocating the third instance of the first service to the first user would cause the count of instances of the first service allocated to the first user to fall below the threshold;
- outputting, to the first user, an indication to deploy the third instance of the first service; and
- responsive to receiving approval from the first user:
  - deploying the third instance of the first service in the first cloud computing environment;
  - building the first application using the third instance of the first service; and
  - rebuilding all other applications associated with the first user that access the first service to use the third instance of the first service.

5. The method of claim 1, wherein identifying the second instance of the first service comprises:
- determining, by the instance of the inventory module in the first cloud computing environment, that no instances of the first service are available in the first cloud computing environment;
- broadcasting, by the instance of the inventory module in the first cloud computing environment, a request a plurality of other instances of the inventory module in the plurality of other cloud computing environment, wherein the request specifies to identify an instance of the first service in the respective cloud computing environment; and
- receiving, by the instance of the inventory module in the first cloud computing environment from an instance of the inventory module in a second cloud computing environment, an indication that the second instance of the first service exists in the second cloud computing environment.

6. The method of claim 1, wherein the second instance of the first service is identified upon determining: (i) that a set of access permissions for the second instance of the first service permit a first user associated with the first application to access the second instance of the first service, and (ii) that a set of deployment constraints permit deployment of the second instance of the first service in the first cloud computing environment.

7. A computer program product, comprising:
- a non-transitory computer-readable storage medium having computer readable program code embodied therewith, the computer readable program code executable by a processor to perform an operation comprising:
  - deploying a first application in a first cloud computing environment of a plurality of cloud computing environments, wherein the first application is composed of a first instance of a first service;
  - storing, in an inventory data store, data describing: (i) each of the components of the first application, wherein the components comprise a plurality of services including the first instance of the first service and a first application code, and (ii) a cost of deploying the first application;
  - storing, in a composer data store, data describing: (i) how to bind the plurality of services, (ii) how to add the application code to the plurality of services, (iii) where the services and the application code are located, (iv) a set of entities able to access each of the plurality of services and the first application code, and (v) a set of constraints for deploying instances of the first service and the first application; and
  - storing, in a learning data store, data describing: (i) the existence of the first application in the first cloud computing environment, and (ii) a respective priority for the first application and the first instance of the first service;
  - determining that the first service has become unavailable in the first cloud computing environment;
  - identifying, by an instance of inventory module executing in the first cloud computing environment, a second instance of the first service in one of the plurality of cloud computing environments, wherein the second instance of the first service is identified in a second cloud computing environment, of the plurality of cloud computing environments;
  - building the first application using the second instance of the first service; and
  - redeploying, in the first cloud computing environment, the first application built using the second instance of the first service.

8. The computer program product of claim 7, the operation further comprising subsequent to redeploying the first application in the first cloud computing environment:
- storing, in the inventory data store, data describing: (i) each of the components of the first application, wherein the components comprise a plurality of services including the second instance of the first service in the second cloud computing environment and the first application code, and (ii) a cost of deploying the first application using the second instance of the service;

storing, in the composer data store, data describing: (i) how to bind the plurality of services including the second instance of the first service in the second cloud computing environment, (ii) how to add the application code to the plurality of services, (iii) where the services and the application code are located, (iv) a set of entities able to access each of the plurality of services and the first application code, and (v) a set of constraints for deploying instances of the first service and the first application; and storing, in the learning data store, data describing: (i) the existence of the first application in the first cloud computing environment, and (ii) a respective priority for the first application and the second instance of the first service.

9. The computer program product of claim 7, the operation further comprising:

determining that an instance of a second service has been deployed in the first cloud computing environment;

determining that a second application uses the second service and can be deployed based on the deployment of the second service;

building the second application using the instance of the second service; and deploying the second application built using the instance of second service in the first cloud computing environment.

10. The computer program product of claim 7, the operation further comprising:

determining that a count of instances of the first service deployed in the first cloud computing environment and allocated to a first user exceed a threshold;

determining that deploying a third instance of the first service and allocating the third instance of the first service to the first user would cause the count of instances of the first service allocated to the first user to fall below the threshold;

outputting, to the first user, an indication to deploy the third instance of the first service; and responsive to receiving approval from the first user:
deploying the third instance of the first service in the first cloud computing environment;
building the first application using the third instance of the first service; and
rebuilding all other applications associated with the first user that access the first service to use the third instance of the first service.

11. The computer program product of claim 7, wherein identifying the second instance of the first service comprises:

determining, by the instance of the inventory module in the first cloud computing environment, that no instances of the first service are available in the first cloud computing environment;

broadcasting, by the instance of the inventory module in the first cloud computing environment, a request a plurality of other instances of the inventory module in the plurality of other cloud computing environment, wherein the request specifies to identify an instance of the first service in the respective cloud computing environment; and receiving, by the instance of the inventory module in the first cloud computing environment from an instance of the inventory module in a second cloud computing environment, an indication that the second instance of the first service exists in the second cloud computing environment.

12. The computer program product of claim 7, wherein the second instance of the first service is identified upon determining: (i) that a set of access permissions for the second instance of the first service permit a first user associated with the first application to access the second instance of the first service, and (ii) that a set of deployment constraints permit deployment of the second instance of the first service in the first cloud computing environment.

13. A system, comprising:
a processor; and
a memory storing one or more instructions which, when executed by the processor, performs an operation comprising:

deploying a first application in a first cloud computing environment of a plurality of cloud computing environments, wherein the first application is composed of a first instance of a first service;

storing, in an inventory data store, data describing: (i) each of the components of the first application, wherein the components comprise a plurality of services including the first instance of the first service and a first application code, and (ii) a cost of deploying the first application;

storing, in a composer data store, data describing: (i) how to bind the plurality of services, (ii) how to add the application code to the plurality of services, (iii) where the services and the application code are located, (iv) a set of entities able to access each of the plurality of services and the first application code, and (v) a set of constraints for deploying instances of the first service and the first application; and storing, in a learning data store, data describing: (i) the existence of the first application in the first cloud computing environment, and (ii) a respective priority for the first application and the first instance of the first service, determining that the first service has become unavailable in the first cloud computing environment;

identifying, by an instance of inventory module executing in the first cloud computing environment, a second instance of the first service in one of the plurality of cloud computing environments, wherein the second instance of the first service is identified in a second cloud computing environment, of the plurality of cloud computing environments;

building the first application using the second instance of the first service; and redeploying, in the first cloud computing environment, the first application built using the second instance of the first service.

14. The system of claim 13, the operation further comprising subsequent to redeploying the first application in the first cloud computing environment:

storing, in the inventory data store, data describing: (i) each of the components of the first application, wherein the components comprise a plurality of services including the second instance of the first service in the second cloud computing environment and the first application code, and (ii) a cost of deploying the first application using the second instance of the service;

storing, in the composer data store, data describing: (i) how to bind the plurality of services including the second instance of the first service in the second cloud computing environment, (ii) how to add the application code to the plurality of services, (iii) where the services and the application code are located, (iv) a set of entities able to access each of the plurality of services and the first application code, and (v) a set of constraints for deploying instances of the first service and the first application; and storing, in the learning data store, data describing: (i) the existence of the first application in the first cloud computing environment, and (ii) a respective priority for the first application and the second instance of the first service.

15. The system of claim 13, the operation further comprising:

determining that an instance of a second service has been deployed in the first cloud computing environment;

determining that a second application uses the second service and can be deployed based on the deployment of the second service;

building the second application using the instance of the second service; and deploying the second application built using the instance of second service in the first cloud computing environment.

16. The system of claim 13, the operation further comprising:

determining that a count of instances of the first service deployed in the first cloud computing environment and allocated to a first user exceed a threshold;

determining that deploying a third instance of the first service and allocating the third instance of the first service to the first user would cause the count of instances of the first service allocated to the first user to fall below the threshold;

outputting, to the first user, an indication to deploy the third instance of the first service; and responsive to receiving approval from the first user:

deploying the third instance of the first service in the first cloud computing environment;

building the first application using the third instance of the first service; and rebuilding all other applications associated with the first user that access the first service to use the third instance of the first service.

17. The system of claim 13, wherein identifying the second instance of the first service comprises:

determining, by the instance of the inventory module in the first cloud computing environment, that no instances of the first service are available in the first cloud computing environment;

broadcasting, by the instance of the inventory module in the first cloud computing environment, a request a plurality of other instances of the inventory module in the plurality of other cloud computing environment, wherein the request specifies to identify an instance of the first service in the respective cloud computing environment; and receiving, by the instance of the inventory module in the first cloud computing environment from an instance of the inventory module in a second cloud computing environment, an indication that the second instance of the first service exists in the second cloud computing environment.

* * * * *